(12) United States Patent
Morphis et al.

(10) Patent No.: US 8,639,700 B2
(45) Date of Patent: Jan. 28, 2014

(54) SYSTEM AND METHOD FOR EFFICIENTLY REPRESENTING AND MANAGING A COMPUTER FACILITY

(75) Inventors: Kelly Evan Morphis, Arlington, TX (US); Joshua Logan Reese, Lewisville, TX (US)

(73) Assignee: Softlayer Technologies, Inc., Dallas, TX (US)

( * ) Notice: Subject to any disclaimer, the term of this patent is extended or adjusted under 35 U.S.C. 154(b) by 263 days.

(21) Appl. No.: 13/185,857

(22) Filed: Jul. 19, 2011

(65) Prior Publication Data
US 2013/0024458 A1  Jan. 24, 2013

(51) Int. Cl.
*G06F 17/30* (2006.01)

(52) U.S. Cl.
USPC .......................................... 707/741; 709/225

(58) Field of Classification Search
USPC .................................. 707/741; 709/223–225
See application file for complete search history.

(56) References Cited

U.S. PATENT DOCUMENTS

| | | | |
|---|---|---|---|
| 7,002,944 B2* | 2/2006 | Kats et al. | 370/338 |
| 7,110,375 B2* | 9/2006 | Khalil et al. | 370/331 |
| 7,209,805 B2* | 4/2007 | Motoyama | 700/286 |
| 7,391,771 B2* | 6/2008 | Orava et al. | 370/389 |
| 7,394,773 B2* | 7/2008 | Brooks | 370/254 |
| 8,073,789 B2* | 12/2011 | Wang et al. | 706/12 |
| 8,402,053 B2* | 3/2013 | Roediger et al. | 707/770 |
| 8,478,891 B1* | 7/2013 | Breau et al. | 709/233 |
| 2003/0033402 A1* | 2/2003 | Battat et al. | 709/224 |
| 2005/0160136 A1* | 7/2005 | Takahashi | 709/200 |
| 2011/0317707 A1* | 12/2011 | Banerjee | 370/392 |
| 2012/0166392 A1* | 6/2012 | Roediger et al. | 707/626 |

* cited by examiner

*Primary Examiner* — Debbie Le
(74) *Attorney, Agent, or Firm* — Darius C. Gambino; IP Group of DLA Piper LLP

(57) ABSTRACT

A method of representing and managing hierarchical relationship configuration in a computing facility is described. The method includes providing and storing a first index of hardware identifier assigned to each object in the computing facility; providing and storing a second index of ancestry identifiers of each object in the computing facility, the ancestry identifier of an object being the hardware identifier of an ancestor object at 1 to n hierarchy levels above the object; providing and storing a type information element for each ancestor object indicative of a type of ancestor object; and identifying an ancestor object of a particular object in the computing facility by accessing the first index of hardware identifier of the particular object, and identifying an ancestor object thereof of a particular type by accessing the ancestry identifiers and the type information element of the particular object.

6 Claims, 5 Drawing Sheets

| HARDWARE ID | PARENT ID | TYPE | NAME |
|---|---|---|---|
| 1 | Null | DATACENTER | DAL01 |
| 10 | 1 | SERVER ROOM | 01 |
| 50 | 10 | RACK | 05 |
| 101 | 50 | SLOT | 20 |

| HARDWARE ID | PARENT ID | TYPE | NAME |
|---|---|---|---|
| 1 | Null | DATA CENTER | DAL01 |
| 10 | 1 | SERVER ROOM | 01 |
| 50 | 10 | RACK | 05 |
| 101 | 50 | SLOT | 20 |

| HARDWARE ID | ANCESTOR ID | TYPE |
|---|---|---|
| 101 | 50 | RACK |
| 101 | 10 | SERVER ROOM |
| 101 | 1 | DATA CENTER |

SYSTEM AND METHOD FOR EFFICIENTLY REPRESENTING AND MANAGING A COMPUTER FACILITY

FIELD

The present disclosure relates to a system and method for efficiently representing and managing a computer facility.

BACKGROUND

Today's data hosting computing facilities often encompass multiple data centers distributed in many countries in order to better serve globally-based customers. These facilities employs a large number of servers housed in server rooms. The servers provide myriad functionalities and services, and are networked so that each server may communicate with one another and with other equipment. Communication in the data centers are most often based on networks running the IP protocol suite. These computing facilities also use equipment such as routers and switches to transport traffic between the servers and to the outside world.

SUMMARY

A system and method have been envisioned for efficiently representing and managing a computer network facility.

A method of representing and managing hierarchical relationship configuration in a computing facility is described. The method includes providing and storing a first index of hardware identifier assigned to each object in the computing facility; providing and storing a second index of ancestry identifiers of each object in the computing facility, the ancestry identifier of an object being the hardware identifier of an ancestor object at 1 to n hierarchy levels above the object; providing and storing a type information element for each ancestor object indicative of a type of ancestor object; and identifying an ancestor object of a particular object in the computing facility by accessing the first index of hardware identifier of the particular object, and identifying an ancestor object thereof of a particular type by accessing the ancestry identifiers and the type information element of the particular object.

A method of representing and managing network connectivity configuration in a computing facility is described. The method includes providing and storing a first index of hardware identifier assigned to each network object in the computing facility; providing and storing a second index of network connector identifiers to each connector object in the computing facility, the connector object of a network object being the hardware component that connects the network object to another network connector or network object; providing and storing an uplink level information element for each uplink network object connected to the network object indicative of an uplink level position from the network object; identifying an uplink network object of a particular network object in the computing facility by accessing the first index of hardware identifier of the particular network object, and identifying uplink network objects thereof by accessing the second index of network connector identifiers of the particular network object, and the level information element of the uplink network objects; and updating the indices and level information elements affected by a change of network connectivity in the computing facility.

A computer-implemented method for managing an hierarchical configuration in a computing facility is described. The computer-implemented method includes providing and storing a first index of hardware identifier assigned to each object in the computing facility; providing and storing a second index of hardware identifiers of each object uplink from the object in the hierarchical configuration in the computing facility; providing and storing an information element associated with each object uplink from the object and indicative of a type of uplink object; and accessing the first index of hardware identifier of a particular object, and identifying the second index of the uplink objects filtered by the information element to determine a particular object uplink from the particular object.

A computer-readable storage medium storing a representation of an hierarchical configuration in a computing facility is described. The computer-readable medium includes a first index of hardware identifier assigned to each object in the computing facility; a second index of hardware identifiers of each object uplink from the object in the hierarchical configuration in the computing facility; an information element associated with each object uplink from the object and indicative of a type of uplink object; wherein any uplink object of any object in the computing facility is identified by accessing the first index of hardware identifier of the object, and identifying the second index of the objects filtered by the information element; and updating the indices and information elements affected by a change of hierarchical configuration in the computing facility.

A computer-implemented method for managing an hierarchical configuration in a computing facility is described. The method includes accessing a first index of hardware identifier in a table identifying a particular object in the computing facility; accessing a second index of hardware identifier in the table indicative of objects uplink from the particular object in the hierarchical configuration in the computing facility; and filtering the uplink objects using an information element associated with each uplink object to identify a particular a particular type of object uplink from the particular object.

DETAILED DESCRIPTION

Figure 1:
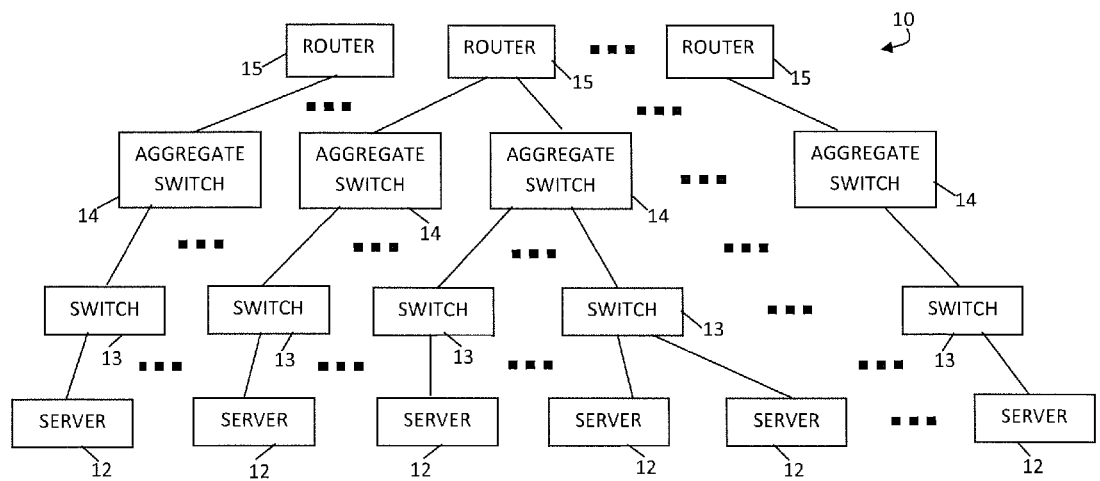
FIG. 1 is a simplified block diagram of an exemplary hierarchical connectivity configuration of an exemplary computer network.

FIG. 1 is a simplified block diagram of an exemplary computer network 10 of a computing facility. Computer network 10 includes a variety of network nodes that perform myriad functions, such as servers 12, switches 13, aggregate switches 14, and routers 15. As shown in FIG. 1, each server 12 is coupled to a switch 13, which is coupled to an aggregate switch 14, which is in turn coupled to a router 15. The switches 13, aggregate switches 14, and routers 15 primarily route data traffic so that the servers 12 may communicate with one another and with other equipment within and outside of the computing facility. In the computer network 10, a router 15 may be coupled to one or more aggregated switches 14; an aggregate switch 14 may be coupled to one or more switches 13; and a switch 13 may be coupled to one or more servers 12.

The network nodes of the computer network 10 may be geographically located remotely from one another, or be co-located proximately in the same building or facility. For example, the servers 12 may be located in one or more cities or countries. The network links interconnecting the network nodes may be constructed of any suitable medium such as optical fiber, copper, wireless, etc. Further, any one or more network protocols now known, such IP (Internet Protocol), or to be developed may be used in the network links to transmit data and signals in the computer network 10.

As shown in FIG. 1, the network nodes of the computer network 10 are configured to have an hierarchical connectivity, where a router 15 is generally one level uplink from an aggregate switch 14, two levels uplink from a switch 13, and three levels uplink from a server 12.

Figure 2:
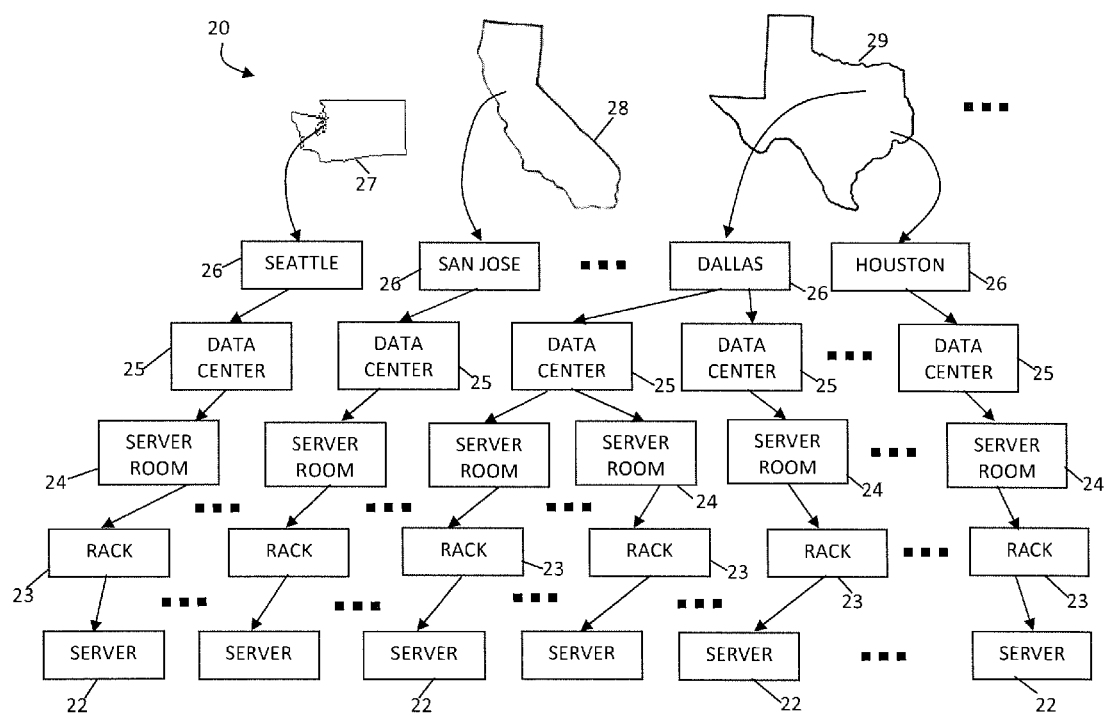
FIG. 2 is a simplified block diagram of an exemplary hierarchical location configuration of computer facility.

FIG. 2 is a simplified block diagram representing an exemplary hierarchical location configuration of a computer facility 20. The computing facility 20 may be dispersed among one or more countries, states, regions, cities, etc. In the example shown, a plurality of servers 22 belonging to the computing facility 20 are assigned and physically occupy slots in a plurality of racks 23. The racks 23 may each hold one to fifty-five servers 22, for example. The racks 23 are housed in a plurality of server rooms 24, which are physically located in one or more data centers 25. These data centers 25 may be located in one or more cities 26. In the example shown, the data centers 25 are located in Seattle, San Jose, Dallas, and Houston. One or more data centers 25 may be located in each city 26. The cities 26 are further mapped to states, e.g., Washington 27, California 28, and Texas 29. Additional levels of hierarchy above the state level are contemplated herein, such as region, country, continent, etc.

Accordingly, the simplified diagram in FIG. 2 illustrates the physical location and hierarchical relationship of the "objects" or equipment in the computing facility 20. It illustrates the nested relationship of a specific server in a specific rack, in a specific server room, in a specific data center, in a specific city, and in a specific state.

Figure 4:
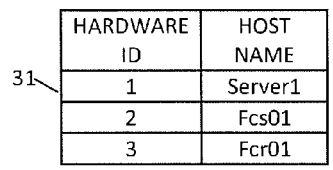
FIG. 4 is a diagram illustrating an exemplary hardware ID table of the exemplary portion of a computer network.
Figure 5:
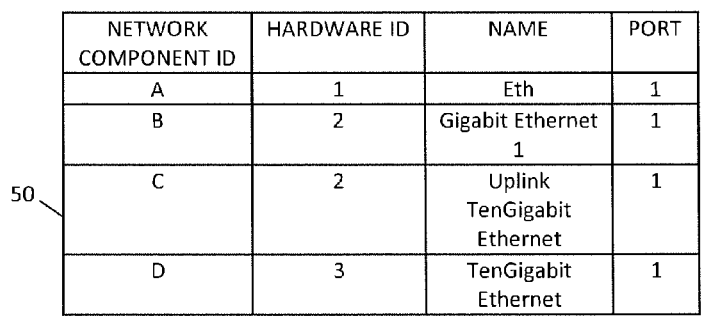
FIG. 5 is a diagram illustrating an exemplary network component ID table of the exemplary portion of a computer network.
Figure 6:
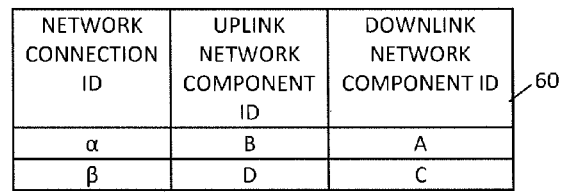
FIG. 6 is a diagram illustrating an exemplary network connection ID table of the exemplary portion of a computer network.
Figure 7:
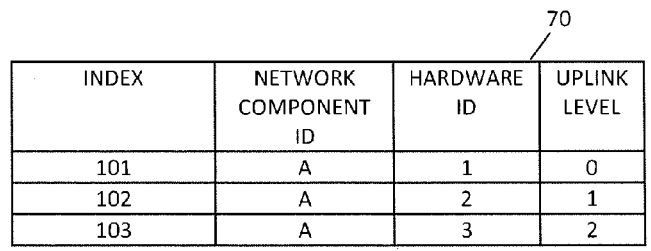
FIG. 7 is a diagram illustrating an exemplary network connectivity configuration table of the exemplary portion of a computer network.

Both the computer network connectivity illustrated in FIG. 1 and the physical location and hierarchical relationship of the servers in the computer network and a computing facility, respectively, may be represented and managed according to the system and method described herein. The tables in FIGS. 4-6 are tables used to represent the network node and network component connectivity configuration in the computer network. The table in FIG. 7 is an additional new table that greatly simplified searching for and identifying network connectivity configuration.

Figure 3:
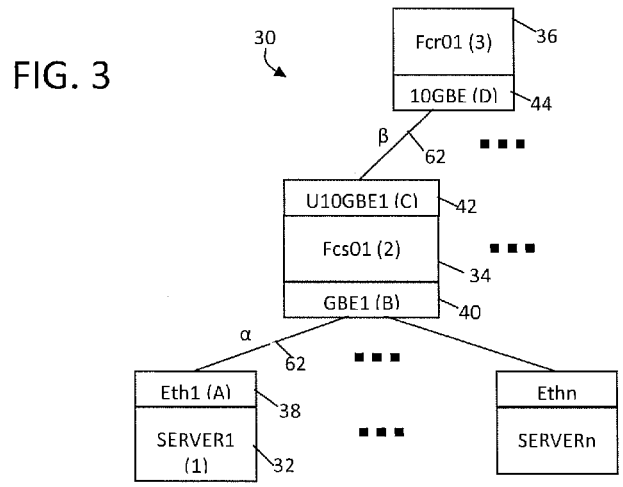
FIG. 3 is a simplified diagram of an exemplary portion of a computer network.

FIG. 3 is a simplified diagram of an exemplary portion 30 of a computer network including a server 32, a switch 34, and a router 36. A first table 31 representing the computer network portion with the hardware ID and host name of the network components is shown in FIG. 4. The table 31 is referred to as the hardware ID table. The server 32, SERVER1, has a network component such as an Ethernet port 38, Eth1. The server 32 is coupled to the switch 34, Fcs01, via another Ethernet port, GigabitEthernet1 (GBE1) 40. The switch 34 is in turn coupled to a router 36, Fcr01, via its own Ethernet port, Uplink10GigbitEthernet1 (U10GBE1) 42 and an Ethernet port of the router 40, 10GigabitEthernet (10GBE) 44.

A second table 50 representing the computer network components 38-44 is shown in FIG. 5. The table 50 is referred to as the network component ID table. The table 50 includes a first column including the network component ID of the network components 38-44. The second column includes the hardware ID of the network nodes associated with the respective network components. For example, for network component 38, Eth1, its associated network node is identified by the hardware ID=1, which denotes the server network node 32, SERVER1. The third column of the table includes the names of the network components. The fourth column denotes which ports in the network component the connections are made.

A third table 60 representing the computer network connections is shown in FIG. 6. The table 60 is referred to as the network connection ID table. The network connection ID table 60 includes a first column that denotes the network connection ID between the network nodes 32, 34, and 36. The network connection ID α identifies the link 62 between network component 38 (Eth1) and network component 40 (GBE1). Further, the network connection ID β identifies the link 64 between network component 42 (U10GBE1) and network component 44 (10GBE). The second column of the table 60 provides the network component ID of the network components uplink and downlink of the network connection. Thus, for example, for network connection 62 (α), network component 38 (Eth1) having network component ID=A is downlink therefrom, and network component 40 (GigabitEthernet1 or GBE1) having network component ID=B is uplink therefrom.

It should be noted that the tables 31, 50, and 60 are greatly simplified in that many additional columns and rows have been omitted from the figures in order to provide a clear and concise explanation.

Using the tables 31, 50, and 60, a user at the computing facility may execute computer code to determine, for example, which router is coupled to a specific server. For example, using the hardware ID=1, SERVER1 is identified in tables 31 and 50. The hardware ID=1 of the hardware ID table 31 is used to join the network component table 50 to arrive at the network component ID=A, which identifies the network component 38 (Eth1). The network component ID=A in the table 50 is then used to join the network connection ID table 60 to determine its uplink network component, which is network component 40 (GBE1) having network component ID=B. The network component ID=B in table 60 is then used to join the network component ID=B in the network component ID table 50, to determine that the network node 34 having hardware ID=2 is associated with network component ID=B.

In the network component ID table 50, hardware ID=2 is also associated with network component ID=C, which is Uplink10GigbitEthernet1 (U10GBE1) 42. This is used to join the network connection ID table 60 to determine that the corresponding uplink network component ID is D, which is 10GigabitEthernet (10GBE) 44. The network component ID=D is used to join the network component ID table 50, to determine that its network node is identified as having the hardware ID=3, which corresponds to the router (Fcr01) 36 identified in the table 31. Accordingly following these steps, the router (Fcr01) 36 is identified as the router that is coupled to the server (Eth1) 32.

As seen above, these repeated table join steps for even a simple query as "get me the router coupled to server X" are expensive and taxing on resources. The above steps may be carried out in the form of database table joins as known in the art or other manners of data structure manipulations later to be developed.

FIG. 7 is a diagram illustrating an exemplary network connectivity configuration table 70 of the exemplary portion of a computer network in FIG. 3. The table 70 is referred to as the network connectivity configuration table. The network connectivity configuration table 70 enables a more efficient way to determine which network node are coupled to one another so that a user in the computing facility may determine, for example, which router is coupled to a specific server. The first column in the network connectivity configuration table 70 is an index. The second column is the network component ID of a network component, the third column is the hardware ID of the network nodes associated with the network component identified by the network component ID, and the fourth column is the number of levels uplink from the network component. The number of uplink levels is indicative of the type of the network node. For example in FIG. 3, an object uplink level 1 from a server is a switch, and an object uplink level 2 from a server is a router.

Using the same example described above, SERVER1 has hardware ID=1, which is associated with the network component identified by network component ID=A, at index=101 in the network connectivity configuration table 70. The network component ID=A identifies network component 38 (Eth1). Therefore all three rows having indices 101-103 associated with network component ID=A are relevant to the inquiry as they each indicate a network node that is coupled to SERVER1. Accordingly, filtering using the uplink_level=2, since the router is two levels uplink from the server, the row indicated by index=103 and hardware ID=3, is properly identified as the router (Fcr01) 36 that is the target of the inquiry. Accordingly, instead of having to consult three tables and making many table joining operations, the task of determining the network connectivity configuration is significantly simplified by using the network connectivity configuration table 70. The number of table joins is reduced to one.

Figures 8, 9, 10:
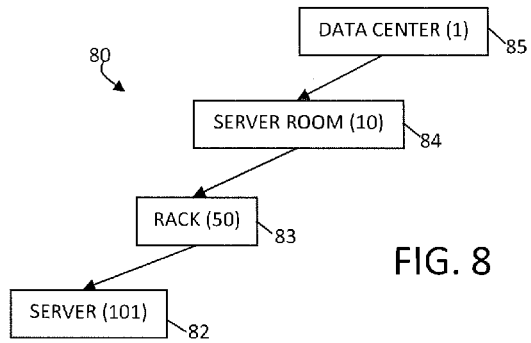
FIG. 8 is a simplified diagram of an exemplary portion of a computer network configuration in computer facility.
FIG. 9 is a diagram illustrating an exemplary hardware location table of the exemplary portion of a computer network configuration.
FIG. 10 is a diagram illustrating indexing to the hardware location table using a exemplary computer network ancestry table.

Recall that FIG. 2 described above is a simplified block diagram of an exemplary hierarchical location configuration of the computing facility 20 which may be dispersed in one or more countries, states, regions, cities, etc. FIG. 8 is a simplified diagram of an exemplary portion 80 of a computer network location configuration in the computing facility 20. The computing facility 20 includes a server 82 having a hardware ID=101, which resides in a slot of a particular rack 83 having a hardware ID=50. The server rack 83 is situated inside a server room 84 assigned a hardware ID=10. The server room 84 is further located in a data center 85 with a hardware ID=1.

FIG. 9 is a diagram illustrating an exemplary hardware location table 90 of the exemplary portion 80 shown in FIG. 8. In the first column the hardware IDs of the objects or hardware equipment in the computing facility are listed. In the second column of the hardware location table 90 are the hardware IDs of the "parent" of the respective pieces of hardware. For example in FIG. 8, the data center 85 is a "parent" of the server room 84, and the rack 83 is a "parent" of the server 82. The third column of the hardware location table 90 indicates the type of "hardware," such as "slot," "rack," "server room," and "data center," for example. The fourth column indicates the respective names assigned to the hardware.

A user at the computing facility 20 may want to know the data center location of a particular server. Using the hardware location table 90 shown in FIG. 9, many table join steps are required to make that query. For example, using the hardware ID, the server 82 is located in the table 90. The slot occupied by the server 82 is identified by the parent ID=50. The parent ID of the slot is then used to join back to the table to determine the "parent" of the rack 83, which is the server room 84 with a hardware ID=10. Then the parent ID of the server room 84 is then used to join back to the table to determine the "parent" of the server room 84, which is the data center 85 with a hardware ID=1. As seen above, these repeated table join steps for even a simple query as "get me the data center of server X" are expensive and taxing on resources.

FIG. 10 is a diagram illustrating indexing to a computer network ancestry table 100 using the hardware location table 90. The computer network location table 100 includes a first column identifying the hardware IDs of the objects in the computing facility 20. Entries having the same hardware ID are preferably grouped together in successive rows. The second column of the table includes an "ancestor" ID, which identifies the hardware IDs of objects that are associated with one another. For example, the rack 83, the server room 84, and the data center 85 are all identified as "ancestors" of the server 82 with the hardware ID=101 in the table. In other words, these objects or hardware are all associated with the server 82 based on location. In the third column is the type information element that identifies the type of object or hardware, such as rack, server room, data center, etc.

Accordingly, in answering the query "in which data center is the server having hardware ID=101," a table join is made from the hardware location table 90 to the network ancestry table 100 which identifies all the entries with hardware ID=101. Accordingly, filtering using the type data element="data center" in the third column of these entries, the data center 85 with hardware ID=1 is easily identified in the network ancestry table 100. Therefore, the number of table joins of the improved method is reduced to one.

Figure 11:
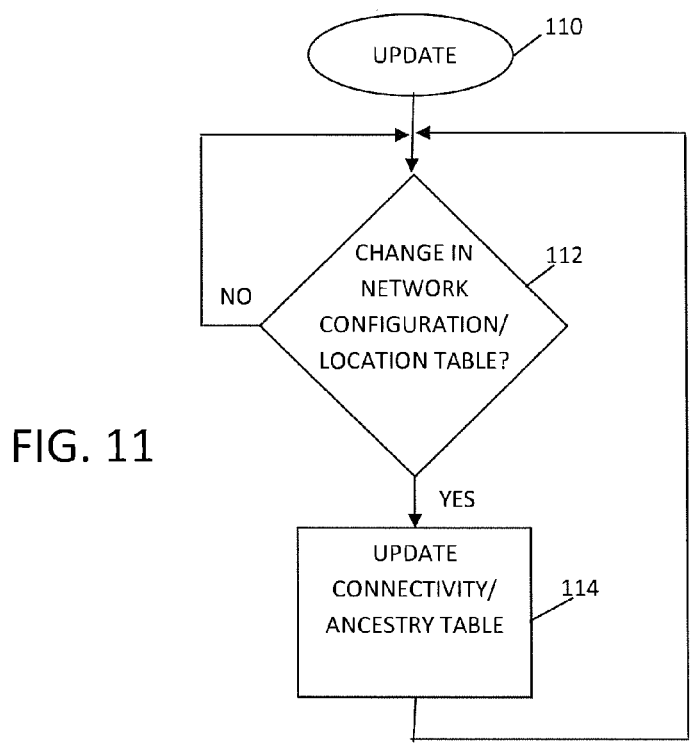
FIG. 11 is a flowchart of an exemplary method to update the network connectivity configuration and ancestry tables.

FIG. 11 is a flowchart of an exemplary method 110 to update the network connectivity table 70 and/or the network ancestry table 100. Any time a change (add or remove) is made in the network configuration tables 31, 50, and 60 and/or the network location configuration table 90, as detected in block 112, the network connectivity table 70 and the network ancestry table 100 are automatically updated to reflect the change so that subsequent queries would produce the correct results. In block 114, the network configuration table tree and/or the network location table tree is traversed to determine what has changed, and the corresponding record(s) reflecting the change are inserted in or removed from the connectivity and/or ancestry table. Accordingly, the network connectivity table 70 and the network ancestry table 100 are updated by database triggers.

It may be noted that although the example described above made representation of hardware equipment in the computer network in the tables, other forms of network nodes and network components may also be included. For example, software applications, logical entities, and other objects may be similarly represented and managed as described above.

The features of the present invention which are believed to be novel are set forth below with particularity in the appended claims. However, modifications, variations, and changes to the exemplary embodiments described above will be apparent to those skilled in the art, and the system and method described herein thus encompass such modifications, variations, and changes and are not limited to the specific embodiments described herein.

What is claimed is:

1. A method of representing and managing network connectivity configuration in a computing facility, the method comprising the steps of:

storing in a table a first multiplicity of indexes of respective hardware identifiers assigned to a respective multiplicity of server objects and network connector objects in the computing facility;

storing in a table first, second and third indexes of respective network connector identifiers assigned to first, second and third ones of the network connector objects, respectively, one of the server objects being connected to the first network connector object, the first network connector object being connected to the second network connector object, and the second network connector object being connected to the third network connector object;

storing in a table (a) a first uplink level identifier for the link first network connector object to represent the first network connector object as being in a first level uplink position from the one server object, (b) a second uplink level identifier for the second network connector object to represent the second network connector object as being in a second level uplink position from the one server object, and (c) a third uplink level identifier for the third network connector object to represent the third network connector object as being in a third uplink level position from the one server object; and subsequently, responsive to removal of one of the first, second or third network connector objects and substitution of another network connector object, substituting and storing in the table of uplink level identifiers another index for another uplink level identifier representing the other, substituted first, second or third network connector object for the uplink level identifier for the removed network connector object.

2. The method of claim 1 wherein the first network connector object is a network switch, the second network connector object is an aggregate network switch and the third network connector object is a router.

3. The method of claim 1 further comprising determining an aggregate switch level network object of one of the server network objects in the computing facility by accessing the first multiplicity of indexes of respective hardware identifiers, and identifying the network connector identifier of the hardware component that connects the one server network object to its uplink network objects, and identifying the aggregate switch level network object by accessing the uplink level information element of the uplink network objects.

4. The method of claim 1 further comprising determining a router level network object of one of the server network objects in the computing facility by accessing the first multiplicity of indexes of respective hardware identifiers, and identifying the network connector identifier of the hardware component that connects the one server network object to its uplink network objects, and identifying the router level network object by accessing the uplink level information element of the uplink network objects.

5. The method of claim 1 further comprising the step of:
for each of the server objects, storing in a table in a hierarchical manner an identifier for a rack containing said each server object, an identifier of a server room containing the rack, and an identifier of a data center containing the server room.

6. The method of claim 2 further comprising the step of:
for each of the server objects, storing in a table in a hierarchical manner an identifier for a rack containing said each server object, an identifier of a server room containing the rack, and an identifier of a data center containing the server room.

* * * * *